US010044925B2

(12) United States Patent
Li et al.

(10) Patent No.: US 10,044,925 B2
(45) Date of Patent: Aug. 7, 2018

(54) TECHNIQUES FOR SETTING FOCUS IN MIXED REALITY APPLICATIONS

(71) Applicant: Microsoft Technology Licensing, LLC, Redmond, WA (US)

(72) Inventors: Hang Li, Bellevue, WA (US); Vishal Jain, Redmond, WA (US); Maria Cheng Lei, Bellevue, WA (US); William Douglas Guyman, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 15/240,850

(22) Filed: Aug. 18, 2016

(65) Prior Publication Data

US 2018/0054562 A1    Feb. 22, 2018

(51) Int. Cl.
| | |
|---|---|
| *G06T 19/00* | (2011.01) |
| *G06T 7/00* | (2017.01) |
| *H04N 5/225* | (2006.01) |
| *H04N 5/232* | (2006.01) |

(52) U.S. Cl.
CPC ....... *H04N 5/23212* (2013.01); *G06T 7/0051* (2013.01); *G06T 19/006* (2013.01); *H04N 5/2254* (2013.01); *H04N 5/23219* (2013.01); *H04N 5/23293* (2013.01)

(58) Field of Classification Search
CPC ........... H04N 5/23212; H04N 5/23219; H04N 5/2254; H04N 5/23293; G06T 19/006; G06T 7/0051
See application file for complete search history.

(56) References Cited

U.S. PATENT DOCUMENTS

| | | |
|---|---|---|
| 9,041,787 B2 | 5/2015 | Andersson et al. |
| 9,230,368 B2 | 1/2016 | Keane et al. |
| 9,245,387 B2 | 1/2016 | Poulos et al. |

(Continued)

FOREIGN PATENT DOCUMENTS

WO    2014088972 A1    6/2014

OTHER PUBLICATIONS

"Building a holographic development team", Published on: Dec. 3, 2015 Available at: https://blogs.windows.com/buildingapps/2015/12/03/building-a-holographic-development-team/.

(Continued)

*Primary Examiner* — Shahbaz Nazrul
(74) *Attorney, Agent, or Firm* — Arent Fox LLP (57) ABSTRACT

Described are examples for capturing one or more real world images for display with one or more computer-generated images (e.g., holograms). One or more computer-generated images for overlaying over one or more real world images can be received, and a depth for overlaying at least one of the computer-generated images over the one or more real world images can be determined. A lens of a camera can be focused based on this depth, and the one or more real world images can be captured via the camera with the lens focused based on the depth. The one or more real world images can be provided as one or more mixed reality images with the one or more computer-generated images overlaid on the one or more real world images, such that the image is focused on objects near the one or more computer-generated images.

20 Claims, 5 Drawing Sheets

(56) References Cited

U.S. PATENT DOCUMENTS

| | | |
|---|---|---|
| 9,292,085 B2 | 3/2016 | Bennett et al. |
| 2010/0194862 A1 | 8/2010 | Givon |
| 2011/0211073 A1 | 9/2011 | Foster |
| 2012/0127062 A1 | 5/2012 | Bar-Zeev et al. |
| 2012/0236172 A1* | 9/2012 | Ellenby .............. G06K 9/00671 348/222.1 |
| 2013/0007672 A1 | 1/2013 | Taubman |
| 2013/0021442 A1 | 1/2013 | Okamoto |
| 2013/0278636 A1* | 10/2013 | Ota ...................... G06T 19/006 345/633 |
| 2013/0328925 A1* | 12/2013 | Latta ..................... G09G 3/003 345/633 |
| 2013/0335404 A1* | 12/2013 | Westerinen ............ G06F 3/033 345/419 |
| 2013/0342570 A1 | 12/2013 | Kinnebrew et al. |
| 2014/0049559 A1 | 2/2014 | Fleck et al. |
| 2014/0098137 A1* | 4/2014 | Fein ........................ G06T 11/60 345/633 |
| 2014/0111838 A1* | 4/2014 | Han ..................... G02B 27/017 359/13 |
| 2015/0003819 A1 | 1/2015 | Ackerman et al. |
| 2015/0138383 A1 | 5/2015 | Kelley et al. |
| 2015/0346495 A1* | 12/2015 | Welch ................ G02B 27/0172 345/8 |
| 2016/0026253 A1* | 1/2016 | Bradski ................ G02B 27/225 345/8 |
| 2016/0027215 A1 | 1/2016 | Burns et al. |
| 2016/0110921 A1* | 4/2016 | Takahashi ............. G06T 19/006 345/633 |

OTHER PUBLICATIONS

Hachman, Mark, "We found 7 critical HoloLens details that Microsoft hid inside its developer docs", Published on: Mar. 2, 2016 Available at: http://www.pcworld.com/article/3039822/consumer-electronics/we-found-7-critical-hololens-details-that-microsoft-hid-inside-its-developer-docs.html.

Liu, et al., "Viewing-angle enlargement in holographic augmented reality using time division and spatial tiling", In Proceedings of Optics Express, vol. 21, Issue 10, May 10, 2013, pp. 12068-12076.

"Designing for mixed reality", Retrieved on: Jul. 25, 2016 Available at: https://developer.microsoft.com/en-us/windows/holographic/designing_for_mixed_reality.

"International Search Report and Written Opinion Issued in PCT Application No. PCT/US2017/046462", dated Oct. 19, 2017, 13 Pages.

* cited by examiner

TECHNIQUES FOR SETTING FOCUS IN MIXED REALITY APPLICATIONS

BACKGROUND

Mixed reality (MR) relates to a field of computer research that describes the combination of real world and computer-generated data. Conventionally, MR employs the use of real world video imagery, which is digitally processed and mixed with the addition of computer-generated graphics, which may include two-dimensional or three-dimensional images, e.g., holograms. Some MR systems utilize a camera to obtain one or more images (e.g., video frames) of reality, and overlay one or more holograms on the one or more images for display on a device display, where the display device may be a display on an MR device, a display on another device, a remote display, etc. The device that displays the MR overlaid images, in one specific application, can be a lens-based device that includes the display situated within the lens and in view of a user wearing the device. This device can also include the camera that captures the one or more images of reality, where these one or more images are part of a scene that is located in front of the lens. Similarly, a camera-enabled wireless phone or other device with a camera can be used to capture the one or more images of reality and generate the one or more images with one or more holograms overlaid on the one or more images. For example, the camera-enabled wireless phone may have a back-facing camera on an opposing side of the display, such that the camera can capture the one or more images of reality that are in front of the display.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computing device is provided that includes a camera including a lens configured to capture and provide one or more real world images, and at least one processor configured to overlay one or more computer-generated images over the one or more real world images. The at least one processor is configured to cause the camera to focus the lens for capturing the one or more real world images based at least in part on a depth at which the at least one processor overlays at least one of the one or more computer-generated images.

In another example, a method for capturing one or more real world images for providing with one or more computer-generated images is provided. The method includes receiving one or more computer-generated images for overlaying over one or more real world images, determining a depth for overlaying at least one of the one or more computer-generated images over the one or more real world images, focusing a lens of a camera based on the depth, capturing the one or more real world images via the camera with the lens focused based on the depth, and providing the one or more real world images as one or more mixed reality images with the one or more computer-generated images overlaid on the one or more real world images.

In another example, a non-transitory computer-readable medium including code for capturing one or more real world images for providing with one or more computer-generated images is provided. The code includes code for receiving one or more computer-generated images for overlaying on one or more real world images, code for determining a depth for overlaying at least one of the one or more computer-generated images on the one or more real world images, code for focusing a lens of a camera based on the depth, code for capturing the one or more real world images via the camera with the lens focused based on the depth, and code for providing the one or more real world images as one or more mixed reality images with the one or more computer-generated images overlaid on the one or more real world images.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to a mixed reality (MR) device for obtaining one or more real world images (e.g., two dimensional (2D) and/or three dimensional (3D) still images, frames of a 2D and/or 3D video, etc., of physical, real-world or real-life objects) and overlaying them with one or more computer-generated graphics (e.g., 2D and/or 3D images, where the 3D images may be referred to herein as "holograms"), where a lens of a camera capturing the one or more real world images can be controlled to be focused at a depth based on at least one of the one or more holograms. For example, the MR device can render a hologram at a specific position in the one or more images, which may include a depth (e.g., a point on a three-dimensional plane). Rendering the hologram at the depth, in one example, can provide a visual effect of the hologram being positioned on or near a real object in the one or more images to provide the mixed reality. Accordingly, the MR device described herein can focus a lens of the camera capturing the one or more images based on the depth of the hologram (e.g., at the depth of a center point or another point of the hologram) so the real objects at or near the hologram position can be in focus in the image. Though the concepts and functions described herein mainly refer to holograms, focusing the lens of the camera can be similarly performed for substantially any computer-generated graphics (e.g., including 2D images as well) that may be overlaid over the real world images.

In an example, where multiple holograms are present in the image, the MR device can select a hologram for determining the depth at which to focus the lens of the camera, where the selection may be from at least one of the received input (e.g., a detected gesture input, voice recognition input, etc.), determined from one or more sensors (e.g., a gaze tracking sensor to detect eye gaze of a user), automatically determined, which may be based on heuristics of the hologram itself (e.g., size, distance from the MR device, a most recently generated hologram, etc.) and/or based on previously received user inputs from a current and/or previous users (e.g., most recently selected hologram, most selections from other users, etc.), and/or the like. The concepts described herein can improve user experience with mixed reality devices as the associated images can be focused at or around a point where one or more holograms are placed, which is a point that is likely of interest to the user. In an example, the concepts described herein with respect to mixed reality devices can also be applied to augmented reality devices (e.g., devices where hologram placement (e.g., depth) may not change based on the actual, real world image).

Figure 1:
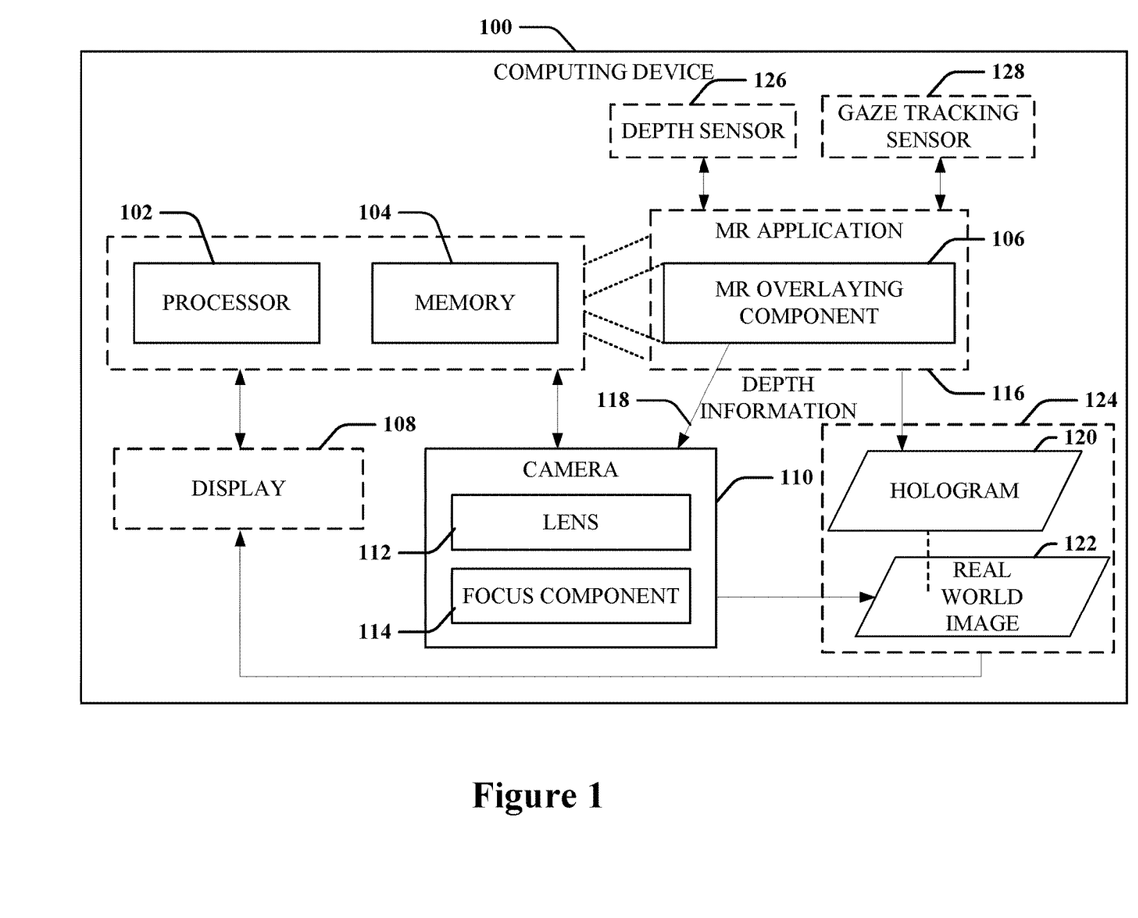
FIG. 1 is a schematic diagram of an example of a computing device that for generating mixed reality images.
Figure 2:
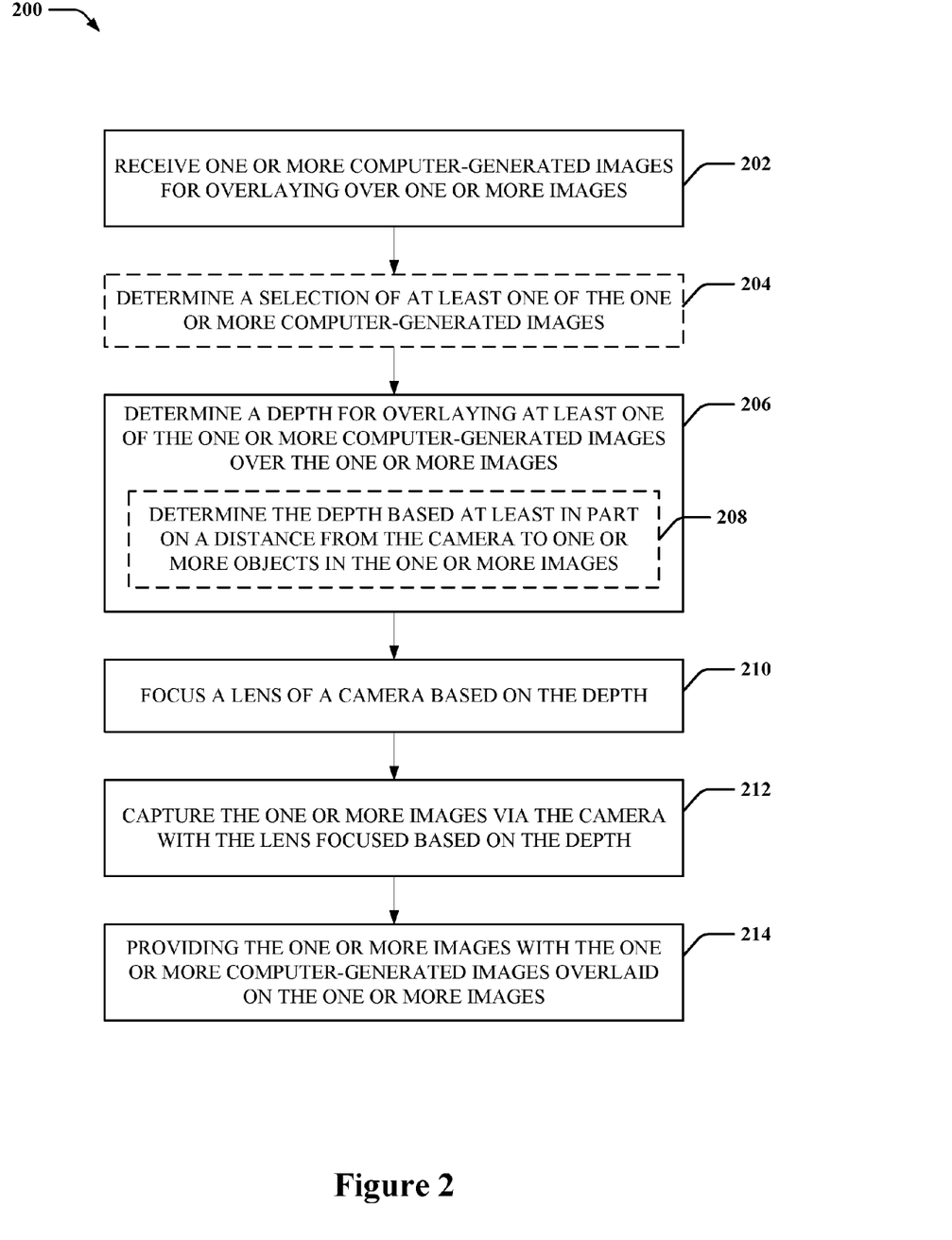
FIG. 2 is a flow diagram of an example of a method for displaying images with one or more overlaid holograms.
Figure 3:
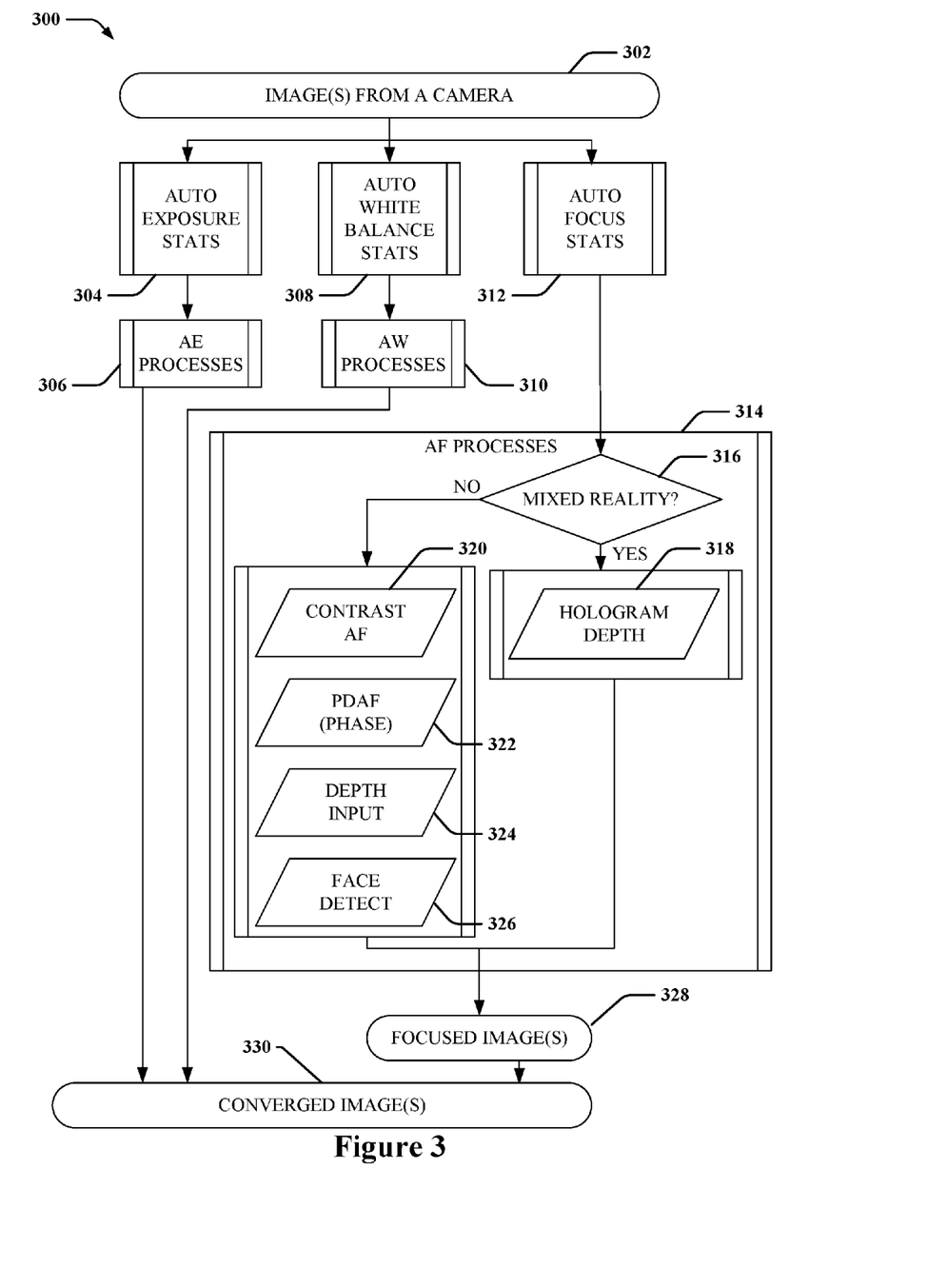
FIG. 3 is a flow diagram of an example of a process for modifying one or more images received from a camera.

Turning now to FIGS. 1-3, examples are depicted with reference to one or more components and one or more methods that may perform the actions or operations described herein, where components and/or actions/operations in dashed line may be optional. Although the operations described below in FIGS. 2 and 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 that can include a processor 102 and/or memory 104 configured to execute or store instructions or other parameters related to executing an MR overlaying component 106 for controlling the focus of a camera 110 based on a depth of a computer-generated graphic (e.g., a hologram 120) to be overlaid on the camera-obtained real world image 122. As described herein, the phrase "controlling the focus of a camera" includes, but is not limited to, controlling a focal length of a lens or set of lenses of the camera 110 used for obtaining a real world image. The computing device 100 can also optionally include a display 108 for displaying, e.g., via instructions from the processor 102, one or more real world images 122 captured by the camera 110, which may be stored in memory 104. The one or more real world images 122 may correspond to 2D and/or 3D still images, frames of a 2D and/or 3D video for rendering the video on the display 108 (or another display), etc., or any other type of real world image corresponding to at least a portion of a real world scene that may be captured by (e.g., within a field of view of) the camera 110. Thus, for example, the camera 110 may be a 2D and/or 3D camera.

The camera 110, for example, can include a lens 112 through which the one or more real world images 122 can be captured, and a focus component 114 for auto-focusing the lens (e.g., setting a focal length) on one or more real world objects in the one or more real world images 122. For example, lens 112 may include a single lens, or a plurality of lenses, e.g., one or more elements that both diverge and converge light to focus it onto a photosensitive surface in the camera 110 and re-assemble the light reflecting from the scene that has passed through the optics, resulting in an image. The focus component 114 can include one or more technologies to provide the auto-focusing functionality, such as a detected contrast level at one or more positions in the one or more real world images 122, a detected phase at one or more positions in the one or more real world images 122, a depth of one or more real world objects detected in the one or more real world images 122, a face detection mechanism for detecting a person's face in the one or more real world images 122, etc. In an example, however, the MR overlaying component 106 can provide depth information relating to the hologram 120 to the focus component 114 for use in performing auto-focus of the lens 112.

In an example, processor 102 and/or memory 104 can be configured to execute an MR application 116 for providing a mixed reality image 124 to one or more devices, such as a display 108 (or another locally or remotely located display), and/or another device for displaying or otherwise processing the mixed reality image 124. For example, the MR application 116 can control camera 110 to capture one or more frames (e.g., still images, images for video frames, etc.). The MR application 116 may acquire the one or more real world images 122 from the camera 110, and may cause display of the one or more real world images 122 on the display 108 or another display (e.g., via processor 102). In addition, the MR application 116 can execute the MR overlaying component 106 to generate and overlay one or more holograms 120 over the one or more real world images 122 to create a mixed reality experience for a user viewing the one or more real world images 122 (e.g., via the display 108 or another display). For example, the MR application 116 generates the mixed reality image 124 to provide a visual effect of the one or more holograms 120 as being a part of the real world scene captured in the one or more real world images 122 such that the real world scene near, at, or adjacent to the hologram 120 has the same or a similar degree of focus as the hologram 120.

As part of providing the mixed reality, the MR application 116 can determine where to place the one or more holograms 120 in a given image. For example, the MR application 116 may utilize a depth sensor 126 to detect a depth of one or more real world objects in the one or more real world images 122 (e.g., a wall or other structural member, a piece of furniture, a person or body part, etc.), and can overlay the one or more holograms 120 on the one or more real world objects. In this example, MR application 116 can specify a depth for rendering the one or more holograms 120, which can be based on the detected depth of the one or more real world objects, to overlay the one or more holograms. By specifying the depth, for example, the MR application 116 can provide the visual effect of the one or more holograms 120 being positioned on or near the one or more real world objects. For example, the MR overlaying component 106 may use the depth specified for the one or more holograms 120 to determine a size, a perspective, a shadowing, etc. for rendering the one or more holograms 120 in the real world image 122. MR overlaying component 106 can accordingly overlay the one or more holograms 120 over the real world image 122 based on the specified depth and/or other parameters to provide a mixed reality image 124. Additionally, in some examples, MR application 116 may determine the depth for rendering the one or more holograms 120 based on at least one of a determined size and scale of a mixed reality scene to be depicted in the mixed reality image 124 (e.g., relative to a field of view of the computing device 100), animations that may result in changes to the depth of the one or more holograms 120, a recommended viewing distance for the one or more holograms 120 (e.g., which may be based on determined comfort metrics, viewability or visibility of the one or more holograms 120, etc.), a depth for the one or more holograms 120 that may be specified by user input (e.g., via a user interface) or other configuration, etc.

In accordance with examples described herein, MR overlaying component 106 can also provide the depth information 118 to the focus component 114 of the camera 110 or can otherwise cause the camera 110 to auto-focus at the depth of at least one of the one or more holograms 120 rendered (or to be rendered) in the real world image 122 (or a subsequent real world image). Thus, for example, the MR overlaying component 106 can cause the camera 110 to auto-focus for a current real world image before overlaying the one or more holograms 120 based on the determined depth, and/or for a subsequent real world image based on the depth at which the one or more holograms are rendered in the current image (and/or one or more previous images). In this regard, the real world image 122 can be focused where at least one of the one or more holograms 120 are placed, or are to be placed, in the real world image 122, which can enhance user experience as this is the point in the image where a user's gaze will likely be focused to view the at least one of the one or more hologram 120. In other words, these aspects enhance the user experience by ensuring that the real world portion of the mixed reality image 124 has a same or similar focus as the hologram 120 at a location within the image where the hologram 120 is overlaid, thus seamlessly integrating the hologram with the real world scene.

In an example, where a plurality of holograms are to be rendered on one or more images, MR application 116 can determine which one of the one or more holograms 120 are to be used in setting the focus of the lens 112 (e.g., which one of the holograms 120 for which to provide the depth information 118). For example, MR application 116 can facilitate selection of a hologram by a user by providing an interface, such as a gesture recognition interface to detect a gesture by the user as related to selecting one of the holograms 120, by a voice recognition interface to detect a voice command by the user related to selecting one of the holograms 120, etc. In another example, computing device 100 may include a gaze tracking sensor 128 to detect a position of a user's gaze (e.g., by determining a position of one or more eyes of the user with respect to a point), and MR application 116 may accordingly determine a selection of one of the plurality of holograms 120 based on determining the hologram as being at a position (e.g., on a two-dimensional plane) that is at or near the detected gaze of the user. In another example, MR application 116 can automatically determine selection of one of the plurality of holograms 120 based on heuristics of the hologram itself (e.g., size—such as physical size or file size of the hologram, distance of the hologram from the MR device, a most recently generated hologram, etc.) and/or based on previously received user inputs from a current and/or previous users (e.g., most recently selected hologram, most selections from other users, etc.), and/or the like.

The computing device 100 can be substantially any device capable of capturing and/or displaying (or providing to another device for display) mixed reality images including one or more computer-generated images overlaid on one or more real world images. For example, computing device 100 may be mixed reality device, which may include a lens-based device that can be worn by a user in front of the user's eyes to capture reality in one or more images from a camera on the front of the lens-based device that are displayed at a display near one or both of the user's eyes. In another example, the computing device 100 can be a cellular or wireless phone, tablet, or other personal computing device (e.g., executing an MR application) that can have a camera (e.g., rear-facing camera, a front facing-camera, etc.) and can display images from the camera on a display of the computing device 100 or another device. In yet another example, the display 108 and camera 110 (and/or other components) may be associated with separate devices, such that the display 108 can remotely display images captured by the camera 110 with holograms overlaid on the images, etc.

FIG. 2 is a flowchart of an example of a method 200 for displaying images in mixed reality. For example, method 200 can be performed by a computing device 100 and/or one or more components thereof to facilitate displaying images focused based on one or more holograms overlaid on the images.

In method 200, at action 202, one or more computer-generated images can be received for overlaying over one or more images. In an example, MR overlaying component 106, e.g., in conjunction with processor 102, memory 104, etc., can receive the one or more computer-generated images (e.g., holograms 120) for overlaying over the one or more images (e.g., real world images 122). In an example, the one or more images may also include other generated images, real world images with augmented reality data or graphics overlaid on the images, etc. In one example, where an MR application 116 is providing or otherwise communicating the MR overlaying component 106, the MR application may provide the one or more holograms 120 along with position information to allow the MR overlaying component 106 to overlay the hologram on the one or more images at a given position within the image (e.g., at a position on a two-dimensional space, e.g., a horizontal or x-axis value and a vertical or y-axis value), at a certain depth (e.g., in a three-dimensional space, e.g., a third coordinate or z-axis value), etc. This can allow the MR overlaying component 106 to overlay the one or more holograms using a size, perspective, shadowing, etc. based on the specified depth.

In method 200, optionally at action 204, a selection of at least one of the one or more computer-generated images can be determined. In an example, MR overlaying component 106, e.g., in conjunction with processor 102, memory 104, etc., can determine the selection of the at least one of the one or more computer-generated images (e.g., selection of at least one of the holograms 120). For example, MR overlaying component 106 can determine the selection of the at least one hologram based on receiving a selection of the at least one hologram (e.g., from a MR application 116). In one example, the MR application 116 can specify the hologram (e.g., a largest hologram, a newest hologram, etc. for displaying in the one or more images) as the selected hologram.

In another example, the MR application 116 can provide an interface to facilitate user selection of the at least one hologram. For example, MR application 116 can provide a gesture recognition interface to recognize or detect a gesture from a user indicating selection of a hologram as displayed on a display. In another example, the MR application 116 can provide a voice recognition interface to recognize or detect voice input from the user indicating selection of a hologram as displayed on the display, etc. In yet another example, the MR application 116 can indicate a hologram as the selected hologram based on detecting a user's eye gaze at a position of the hologram displayed on the display (e.g., via gaze tracking sensor 128). In either case, for example, MR application 116 can indicate the selected hologram to the MR overlaying component 106. In another example, MR overlaying component 106 can determine the selection of the hologram based on one or more parameters thereof, such as a size (a physical size or a file size—where a file size may indicate a significant level of detail in the hologram), distance from the computing device 100, a labeling of the hologram provided by the MR application 116, such as heuristics about the importance of the hologram or other aspects of the hologram (e.g., whether the hologram is a solid hologram, transparent or shadow hologram, etc., where preference may be given to solid holograms), etc.

In method 200, at action 206, a depth for overlaying at least one of the one or more computer-generated images over the one or more images can be determined. In an example, MR overlaying component 106, e.g., in conjunction with processor 102, memory 104, etc., can determine a value of the depth for overlaying at least one of the one or more computer-generated images (e.g. holograms 120) over the one or more images. For example, MR overlaying component 106 may receive the depth in depth information 118 for one or more holograms from an MR application 116 and/or MR overlaying component 106, as described above. In another example, determining the depth at action 206 may optionally include, at action 208, determining the depth based at least in part on a distance from the camera to one or more objects in the one or more images. In an example, MR application 116, e.g., in conjunction with processor 102, memory 104, etc., can determine the depth based at least in part on the distance from the camera to one or more objects in the one or more images. In other words, the MR application 116 may want the hologram to be located on or near a real world object, and thus may associate the depth of the hologram with the depth of the real world object.

For example, MR application 116 can determine the depth, e.g., corresponding to a real world object, using a depth sensor 126, which may include a depth camera, a laser, etc., to determine the distance between the camera 110 and the one or more objects in an image generated by the camera 110. For example, the depth sensor 126 can be positioned near or at a known distance from the camera 110 (e.g., on computing device 100 or another device) to facilitate determining the distance from the camera 110 to the one or more objects. MR application 116 can determine the one or more objects on or near which to place the hologram based on detecting one or more characteristics of the one or more objects in the image (e.g., a vertical surface, a profile or shape, etc.). In an example, MR application 116 can determine the depth for the hologram based on the detected distance, and can provide the depth to the MR overlaying component 106 for rendering the hologram at the indicated depth in the one or more images. Moreover, as described in some examples, MR application 116 may determine the depth for rendering the one or more holograms 120 based on at least one of a determined size and scale of a mixed reality scene to be depicted in the mixed reality image 124 (e.g., relative to a field of view of the computing device 100), animations that may result in changes to the depth of the one or more holograms 120, a recommended viewing distance for the one or more holograms 120 (e.g., which may be based on determined comfort metrics, viewability or visibility of the one or more holograms 120, etc.), a depth for the one or more holograms 120 that may be specified by user input (e.g., via a user interface) or other configuration, etc.

In method 200, at action 210, a lens of a camera can be focused at the depth. In an example, focus component 114 of camera 110 can focus the lens 112 of the camera 110 at the depth. For example, MR overlaying component 106, e.g., in conjunction with processor 102, memory 104, etc., can provide the depth information 118 to the focus component 114 for focusing the lens 112 or can otherwise provide a command and/or one or more parameters to the focus component 114 to focus the lens 112 of the camera 110. Camera 110 and/or focus component 114, in this regard, may be operated or operable by processor 102 and/or a separate processor to allow modification of the focal length of lens 112 in this regard. In one example, MR overlaying component 106 that causes the lens 112 to focus at a certain depth can override one or more other auto-focusing processes of the camera 110, as described further herein, to result in the focus being at the depth of the hologram. In another example, camera 110 can be configured to receive the depth information 118 from the MR overlaying component 106 and can accordingly focus the lens 112 to the depth based on the depth information. In either case, focus component 114 can focus the depth of the camera at or near the hologram.

For example, focus component 114 can focus lens 112 (e.g., based on information from MR overlaying component 106) at a depth in the real world image corresponding to a point of depth of the hologram. As the hologram can be a three dimensional image, its depth may vary from one location to another. As such, the MR overlaying component 106 may be configured to use any position of any point in the volume of the hologram as the point to use for setting the depth. In some implementations, for instance, focus component 114 can focus lens 112 (e.g., based on information from MR overlaying component 106) at a depth (e.g., focal length) that corresponds to a center point of the depth of the hologram (e.g., the center point of the hologram along the x-axis, the y-axis, and the z-axis in a three-dimensional space). In another example, focus component 114 can focus the lens 112 (e.g., based on information from MR overlaying component 106) at a depth in the real world image corresponding to another point of the hologram, such as a point having a significant amount of detail, a point corresponding to a face or other portion of the hologram, etc., on which a user is likely to focus their gaze, a point on the hologram closest to the user, a point on the hologram corresponding to a certain real world object, etc. In another example, focus component 114 can focus the lens 112 based on heuristics related to the hologram, such as a size of the hologram, a distance of the hologram from the computing device 100, etc.

For example, MR overlaying component 106 may also receive focus information from the MR application 116 indicating which portion of the hologram should have the surrounding objects in focus. The MR overlaying component 106 can accordingly determine the depth of one or more real world objects surrounding the identified portion of the hologram at the position the hologram is to be overlaid on the one or more images, at action 206. The MR overlaying component 106 can accordingly provide the depth of the one or more objects at a position corresponding to the identified portion of the hologram to focus component 114 for focusing the lens 112. In either case, focus component 114 can obtain the corresponding depth information 118 from MR overlaying component 106, and can accordingly focus the lens 112.

In method 200, at action 212, the one or more images can be captured via the camera with the lens focused based on the depth. For example, the camera 110 can be used to capture the one or more images with the lens 112 focused, e.g., have a focal length set, based on the depth. In one example, the focus component 114 can focus the lens 112 based on the depth received from MR overlaying component 106, as described. For example, focus component 114 can focus the lens 112 at a depth corresponding to a depth at a point of the hologram (e.g., a center point, a point with high detail, etc.), as indicated by MR overlaying component 106. Accordingly, objects in the one or more images at the point where the hologram is to be overlaid can be in focus in the one or more images.

In method 200, at action 214, the one or more images can be provided with the one or more computer-generated images overlaid on the one or more images. For example, the MR overlaying component 106, e.g., in conjunction with processor 102, memory 104, etc. can provide the one or more images (e.g., real world images 122) with the one or more computer-generated images (e.g., holograms 120) overlaid on the one or more real world images 122 (e.g., to generate one or more mixed reality images 124). For example, MR overlaying component 106 can provide the one or more images for display on a display 108, on a remotely located display, etc. In an example, MR overlaying component 106 can provide the one or more images as an image stream to one or more displays or other devices for consumption, rendering, or other processing of the one or more images. Moreover, for example, providing the one or more images can include displaying the one or more images on a display 108 or other display. As described, due to focusing of the lens 112 of camera 110 based on the depth of the hologram, the displayed one or more images can be focused such that objects in the one or more images at or near at least one of the one or more holograms are in focus.

FIG. 3 illustrates an example of a process 300 for processing images generated by a camera, such as camera 110, including auto-focus (AF) processes 314 that may be executed by MR application 116 and/or MR overlaying component 106. Image(s) from a camera 302 can include one or more real world images (e.g., real world images 122, as described above) and can be input into a plurality of processes that may be executed sequentially, in parallel, etc., at a processor coupled to the camera 110 (e.g., processor 102) to process the image(s) from the camera 302. For example, the image(s) from the camera 302 can be provided to an auto exposure (AE) statistics determination process 304 for determining one or more AE parameters to be applied to the image(s) from the camera 302, which can provided to one or more AE processes 306 for applying AE to the image(s) from the camera 302. Similarly, for example, the image(s) from the camera 302 can be provided to an auto white balance (AW) statistics determination process 308 for determining one or more AW parameters to be applied to the image(s) from the camera 302, which can provide to one or more AW processes 310 for applying AW to the image(s) from the camera 302. Additionally, for example, the image(s) from the camera 302 can be provided to an auto focus (AF) statistics determination process 312 for determining one or more AF parameters to be applied to the image(s) from the camera 302, which can provide to one or more AF processes 314 for applying AF to the image(s) from the camera 302 to produce focused image(s) 328.

In an example, the one or more AF processes 314 may include a determination of whether the image(s) from the camera 302 is/are to be transformed into mixed reality image(s) at 316. For example, this can include MR overlaying component 106, processor 102, etc. determining whether one or more holograms are to be overlaid on the image(s) from the camera 302 or not. In one example, this determination at 316 may coincide with receiving one or more holograms for overlaying over the image(s) from the camera 302 (e.g., as in action 202, from MR application 116, etc.). If it is determined that the image(s) from the camera 302 are not to include mixed reality, one or more AF adjustments can be made to the image(s) from the camera 302. The AF data adjustments can include one or more of a contrast AF adjustment 320 to adjust the auto-focus of a lens of the camera based on a detected contrast of at least a portion of the image(s) from the camera 302, a phase detection AF (PDAF) adjustment 322 to adjust the auto-focus of the lens of the camera based on a detected phase of at least a portion of the image(s) from the camera 302, a depth input adjustment 324 to adjust the auto-focus of the lens of the camera based on an input or detected depth of one or more objects in the image(s), and/or a face detect adjustment 326 to adjust the auto-focus of the lens of the camera based on a detected face of a person (e.g., a profile of a face) in at least a portion of the image(s) from the camera 302.

If it is determined that the image(s) from the camera 302 are to be transformed to mixed reality image(s), one or more alternative mixed reality AF adjustments can be made to the image(s) from the camera 302 based on the holograms to be overlaid in the image. As described, for example, these mixed reality alternative AF adjustments may override one or more of the contrast AF adjustment 320, PDAF adjustment 322, depth input adjustment 324, face detect adjustment 326, etc. The mixed reality AF adjustments may include a hologram depth adjustment 318 to adjust the auto-focus of the lens of the camera based on input depth of a hologram that is already overlaid, or is to be overlaid, on the image(s) from the camera 302.

In the specific example of process 300, the image(s) output from the AE processes 306, AW processes 310, and AF processes 314, as one or more focused images 328, can be utilized to create converged image(s) 330 additionally having the AE and AW applied. The converged image(s) 330 can be provided to a component for displaying on a display, as described (e.g., with one or more holograms overlaid or otherwise).

Figure 4:
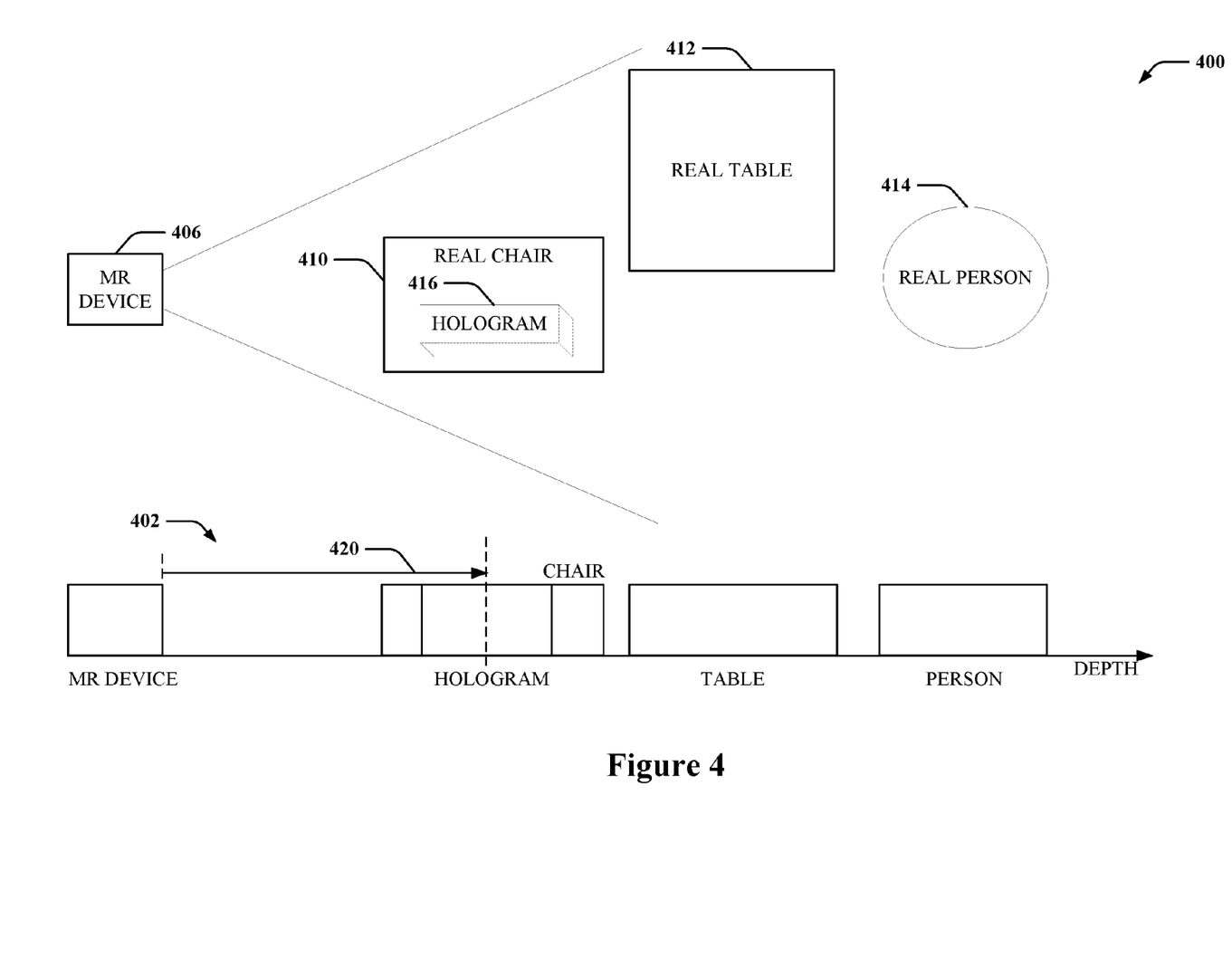
FIG. 4 is a schematic diagram of an example of an image that can be captured and displayed by a mixed reality device.

FIG. 4 illustrates an example of a scene 400 that can be captured as an image by a camera on an MR device, where objects in the image 400 (and/or one or more holograms displayed in the image) have corresponding depths 402. For example, MR device 406 can capture an image 400 (e.g., via a camera, such as camera 110) having a real chair 410, a real table 412, and a real person 414 in the image 400 at varying depths 402 (e.g., where a depth can correspond to a distance from the camera in one or more directions). MR device 406 can also overlay a hologram 416 over the image 400 and near or on the real chair 410 in the image 400. As described, for example, an MR application executing on the MR device 406 can generate the hologram 416 and determine to place the hologram on or near the real chair 410 in the image 400. Accordingly, the MR device 406, e.g., via a MR overlaying component, can cause the camera to auto-focus at a determined depth 420 of the hologram 416. As described, for example, MR device 406, e.g., via a depth sensor, can determine the depth of the real chair 410, and can accordingly determine the depth for overlaying the hologram 416 on or near the real chair 410.

As described, this can override other auto-focus functions of the camera, which may otherwise attempt to focus the camera on the real table 412 or real person 4149 e.g., based on contrast AF, PDAF, depth input, or face detection). In any case, in this example, the image 400 can be focused on one or more objects in the area (e.g., the three-dimensional area) where the hologram 416 is overlaid, and can be accordingly displayed on the MR device 406 or on another display with the hologram 416 overlaid on the image 400.

Figure 5:
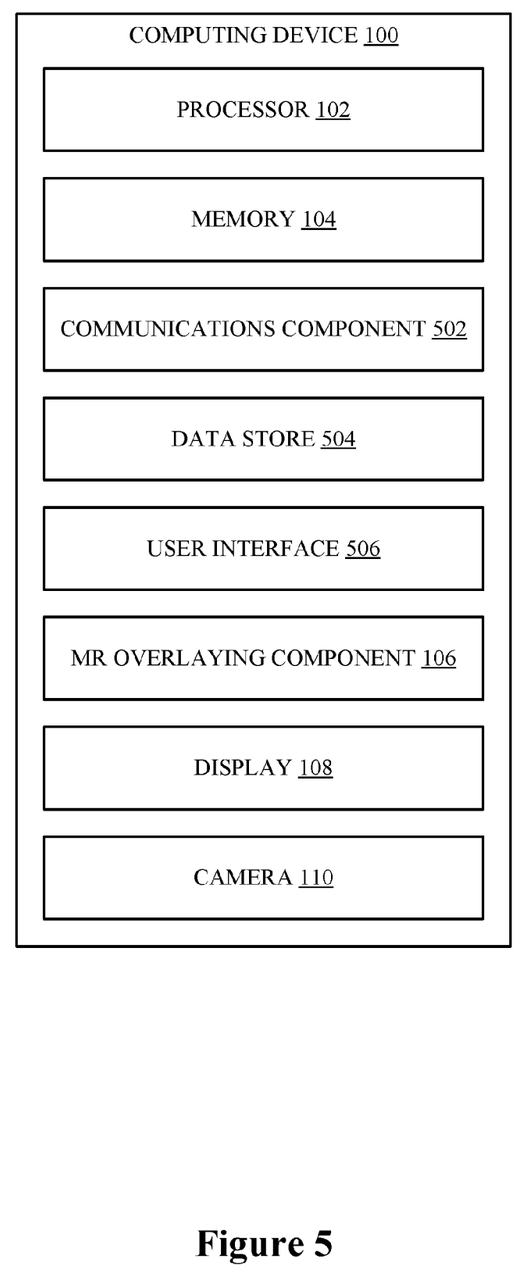
FIG. 5 is a schematic diagram of an example of a computing device for performing functions described herein.

FIG. 5 illustrates an example of computing device 100 including additional optional component details as those shown in FIG. 1. In one aspect, computing device 100 may include processor 102 for carrying out processing functions associated with one or more of components and functions described herein. Processor 102 can include a single or multiple set of processors or multi-core processors. Moreover, processor 102 can be implemented as an integrated processing system and/or a distributed processing system.

Computing device 100 may further include memory 104, such as for storing local versions of applications being executed by processor 102, related instructions, parameters, etc. Memory 104 can include a type of memory usable by a computer, such as random access memory (RAM), read only memory (ROM), tapes, magnetic discs, optical discs, volatile memory, non-volatile memory, and any combination thereof. Additionally, processor 102 and memory 104 may include and execute MR overlaying component 106 and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices.

Additionally, computing device 100 may include a data store 504, which can be any suitable combination of hardware and/or software, that provides for mass storage of information, databases, and programs employed in connection with aspects described herein. For example, data store 504 may be or may include a data repository for applications and/or related parameters (e.g., MR application 116) not currently being executed by processor 102. In addition, data store 504 may be a data repository for MR overlaying component 106 and/or one or more other components of the computing device 100.

Computing device 100 may also include a user interface component 506 operable to receive inputs from a user of computing device 100 and further operable to generate outputs for presentation to the user (e.g., via display 108 or another display). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface to display 108, a speaker, a haptic feedback mechanism, a printer, any other mechanism capable of presenting an output to a user, or any combination thereof.

Computing device 100 may additionally include an MR overlaying component 106, as described, for overlaying one or more holograms over one or more images displayed by display 108 or a remote display, determining a depth at which the one or more holograms are to be displayed in the one or more images, controlling focus of a camera 110 based on the depth, etc. In an aspect, user interface component 506 can be used to detect user input (e.g., gesture, voice, etc.) related to selecting a hologram based on which to focus the camera 110. In addition, processor 102 can execute MR overlaying component 106, and memory 104 or data store 504 can store related instructions, parameters, etc., as described.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computing device, comprising:
a camera comprising a lens configured to capture and provide one or more real world images; and
at least one processor configured to determine whether to transform the one or more real world images to a mixed reality image;
wherein when the at least one processor determines not to transform the one or more real world images, the at least one processor is configured to perform one or more auto-focusing processes of the camera to focus the one or more real world images; and
wherein when the at least one processor determines to transform the one or more real world images, the at least one processor is configured to:
overlay one or more computer-generated images over the one or more real world images; and
override, based on determining to transform the one or more real world images, the one or more auto-focusing processes of the camera by causing the camera to focus the lens for capturing the one or more real world images based at least in part on a depth at which the at least one processor overlays at least one of the one or more computer-generated images.

2. The computing device of claim 1, wherein the at least one processor is further configured to cause the camera to focus the lens at the depth of the at least one of the one or more computer-generated images.

3. The computing device of claim 1, wherein the at least one processor is configured to determine a selection of the at least one computer-generated image based on a size of the at least one computer-generated image, and wherein the at least one processor is configured to cause the camera to focus the lens at least in part in response to the selection.

4. The computing device of claim 1, wherein the at least one processor is configured to cause the camera to focus the lens at the depth corresponding to a point of the at least one of the one or more computer-generated images having a level of detail that achieves a threshold.

5. The computing device of claim 1, wherein the at least one processor is configured to cause the camera to focus the lens at the depth corresponding to a size or distance from the computing device of the at least one of the one or more computer-generated images.

6. The computing device of claim 1, wherein the at least one processor is configured to receive a selection of the at least one of the one or more computer-generated images, and wherein the at least one processor is configured to cause the camera to focus the lens at least in part in response to the selection.

7. The computing device of claim 6, wherein the selection corresponds to a detected gesture to select the at least one of the one or more computer-generated images presented on an interface on a display.

8. The computing device of claim 6, further comprising a gaze tracking sensor configured to track a position of one or more eyes of a user, wherein the selection corresponds to a determination that the one or more eyes of the user are positioned to view the at least one of the one or more computer-generated images.

9. The computing device of claim 6, wherein the selection corresponds to determining one or more heuristics of the at least one of the one or more computer-generated images.

10. The computing device of claim 1, further comprising a display for displaying the one or more real world images overlaid with the one or more computer-generated images, wherein the display is at least one of positioned on the computing device or remotely located from the computing device.

11. A method for capturing one or more real world images for providing with one or more computer-generated images, comprising:
receiving one or more computer-generated images for overlaying over one or more real world images;
determining a depth for overlaying at least one of the one or more computer-generated images over the one or more real world images;
overriding, based on receiving the one or more computer-generated images, an auto-focusing process of a camera at least in part by instead focusing a lens of a camera based on the depth;
capturing the one or more real world images via the camera with the lens focused based on the depth; and
providing the one or more real world images as one or more mixed reality images with the one or more computer-generated images overlaid on the one or more real world images.

12. The method of claim 11, wherein focusing the lens further comprises focusing the lens at the depth for overlaying the at least one of the one or more computer-generated images.

13. The method of claim 11, further comprising determining a selection of the at least one computer-generate image based on a size of the at least one computer-generated image, and wherein focusing the lens is based at least in part on the selection.

14. The method of claim 11, wherein focusing the lens further comprises focusing the lens at the depth corresponding to a point of the at least one of the one or more computer-generated images having a level of detail that achieves a threshold.

15. The method of claim 11, further comprising receiving a selection of the at least one of the one or more computer-generated images, and wherein focusing the lens is based at least in part on the selection.

16. The method of claim 15, further comprising detecting a gesture to select the at least one of the one or more computer-generated images presented on an interface on the display, wherein the selection corresponds to the gesture.

17. The method of claim 15, further comprising:
tracking position of one or more eyes of a user; and
determining that the one or more eyes of the user are positioned to view the at least one of the one or more computer-generated images, wherein the selection corresponds to the determination.

18. A non-transitory computer-readable medium comprising code for capturing one or more real world images for providing with one or more computer-generated images, the code comprising:
- code for receiving one or more computer-generated images for overlaying on one or more real world images;
- code for determining a depth for overlaying at least one of the one or more computer-generated images on the one or more real world images;
- code for overriding, based on receiving the one or more computer-generate images, an auto-focusing process of a camera at least in part by instead focusing a lens of a camera based on the depth;
- code for capturing the one or more real world images via the camera with the lens focused based on the depth; and
- code for providing the one or more real world images as one or more mixed reality images with the one or more computer-generated images overlaid on the one or more real world images.

19. The non-transitory computer-readable medium of claim 18, wherein the code for focusing the lens focuses the lens at the depth for overlaying the at least one of the one or more computer-generated images.

20. The non-transitory computer-readable medium of claim 18, wherein the code further comprises code for determining a selection of the at least one computer-generate image based on a size of the at least one computer-generated image, and wherein focusing the lens is based at least in part on the selection.

* * * * *